United States Patent
Oyama et al.

(10) Patent No.: US 8,720,976 B2
(45) Date of Patent: May 13, 2014

(54) VEHICLE COLLISION PROTECTION APPARATUS

(75) Inventors: Hiroshi Oyama, Isehara (JP); Junichi Shimada, Ebina (JP); Mikito Sawaki, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 13/641,592

(22) PCT Filed: Apr. 28, 2011

(86) PCT No.: PCT/IB2011/000913
§ 371 (c)(1),
(2), (4) Date: Oct. 16, 2012

(87) PCT Pub. No.: WO2011/144976
PCT Pub. Date: Nov. 24, 2011

(65) Prior Publication Data
US 2013/0033048 A1    Feb. 7, 2013

(30) Foreign Application Priority Data
May 17, 2010  (JP) ................................ 2010-112960

(51) Int. Cl.
*B60J 7/00* (2006.01)
(52) U.S. Cl.
USPC .................................................. 296/187.09
(58) Field of Classification Search
USPC ........ 296/187.09, 204, 203.02; 280/271, 274, 280/775, 777, 779, 784, 297; 74/492, 493, 74/512, 560
See application file for complete search history.

(56) References Cited

U.S. PATENT DOCUMENTS

| 5,052,715 | A | * | 10/1991 | Ervin et al. .................... | 280/775 |
| 5,454,453 | A | * | 10/1995 | Meyer et al. ................... | 180/377 |
| 5,704,254 | A | * | 1/1998 | Thomas et al. .................. | 74/492 |

(Continued)

FOREIGN PATENT DOCUMENTS

| DE | 4313785 | 11/1994 |
| DE | 10058113 | 6/2002 |

(Continued)

OTHER PUBLICATIONS

An English Translation of the Korean Notice of Preliminary Rejection for the corresponding Korean patent application No. 10-2012-7030980 issued on Oct. 31, 2013.

(Continued)

*Primary Examiner* — Kiran B Patel
(74) *Attorney, Agent, or Firm* — Global IP Counselors, LLP (57) ABSTRACT

A vehicle collision protection apparatus includes a bracket. The bracket includes a deflecting force generating component provided at a rear end of the bracket. The bracket is disposed in a vehicle front space of a vehicle and extends in a front to rear direction of the vehicle and attach a vehicle component to a body of the vehicle. The deflecting force generating component deflects the rear end of the bracket in a width direction of the vehicle and rotates the bracket together with the vehicle component in the width direction when the deflecting force generating component impinges against a portion of the vehicle body as the rear end of the bracket is displaced in a rearward direction of the vehicle due to crushing of a front end of the vehicle during a collision at the front end of the vehicle.

20 Claims, 8 Drawing Sheets

(56) References Cited

U.S. PATENT DOCUMENTS

| | | | | |
|---|---|---|---|---|
| 5,823,287 | A * | 10/1998 | Chidamparam et al. | 180/377 |
| 6,343,812 | B1 * | 2/2002 | Appelt et al. | 280/775 |
| 7,163,076 | B2 * | 1/2007 | Seksaria et al. | 180/291 |
| 8,033,356 | B2 * | 10/2011 | Kim | 180/271 |
| 8,240,746 | B2 * | 8/2012 | Yamagishi et al. | 296/192 |
| 8,276,966 | B2 * | 10/2012 | Souma et al. | 296/37.2 |
| 8,276,976 | B2 * | 10/2012 | Yasuhara et al. | 296/187.09 |
| 8,287,036 | B2 * | 10/2012 | Nakaura et al. | 296/203.02 |
| 8,336,657 | B2 * | 12/2012 | Dobbins et al. | 180/68.5 |
| 8,365,858 | B2 * | 2/2013 | Tamagawa et al. | 180/291 |
| 2004/0032133 | A1 * | 2/2004 | Bird | 293/154 |
| 2007/0215402 | A1 * | 9/2007 | Sasaki et al. | 180/232 |
| 2008/0265607 | A1 * | 10/2008 | Biggs et al. | 296/72 |
| 2009/0226806 | A1 * | 9/2009 | Kiya | 429/186 |
| 2010/0127531 | A1 * | 5/2010 | Yasuhara et al. | 296/187.09 |
| 2011/0095568 | A1 * | 4/2011 | Terada et al. | 296/187.09 |
| 2012/0312613 | A1 * | 12/2012 | Suzuki et al. | 180/68.5 |
| 2012/0313360 | A1 * | 12/2012 | Akaki et al. | 280/784 |
| 2012/0319388 | A1 * | 12/2012 | Ishii et al. | 280/777 |

FOREIGN PATENT DOCUMENTS

| | | |
|---|---|---|
| DE | 102008015182 | 9/2009 |
| JP | 2003-54452 A | 2/2003 |
| JP | 2003-267063 A | 9/2003 |
| JP | 2005-104354 | 4/2005 |
| JP | 2007-84041 A | 4/2007 |
| JP | 2009-40389 A | 2/2009 |
| JP | 2009-96352 A | 5/2009 |
| RU | 24440 U1 | 8/2002 |
| SU | 996253 A | 2/1985 |

OTHER PUBLICATIONS

An English translation of the Russian Notice of Allowance for the corresponding Russian patent application No. 2012154314/11(086210) issued on Jan. 20, 2014.

An English translation of the Japanese Office Action for the corresponding Japanese patent application No. 2010-112960 issued on Feb. 18, 2014.

* cited by examiner

FIRST-HALF PERIOD OF COLLISION

FIG. 8A

FIRST-HALF PERIOD OF COLLISION

FIG. 8B

SECOND-HALF PERIOD OF COLLISION

FIG. 9A

SECOND-HALF PERIOD OF COLLISION

VEHICLE COLLISION PROTECTION APPARATUS

CROSS-REFERENCE TO RELATED APPLICATIONS

This application is a U.S. National stage of International Application No. PCT/IB2011/000913, filed Apr. 28, 2011. This application claims priority to Japanese Patent Application No. 2010-112960, filed on May 17, 2010. The entire disclosure of Japanese Patent Application No. 2010-112960 is hereby incorporated herein by reference.

BACKGROUND

1. Field of the Invention

The present invention generally relates to a vehicle collision protection apparatus. More particularly, the present invention relates to a vehicle collision protection apparatus for restricting movement of an object present in a space at the front of a vehicle into a vehicle occupant space during a frontal collision

2. Background Information

In a typical vehicle, such as a car, truck, van, SUV and so on, certain main components are accommodated in a space under the hood at the front of a vehicle. These main components can include, for example, the engine, the heating and cooling system, the power steering system, the power brake system, the transmission and so on. During a frontal collusion, at least some of these components can be displaced backward due to the force of impact that can also crush the vehicle front.

To improve occupant safety, the main components should be prevented from shifting rearward into a vehicle occupant space, such as the vehicle passenger compartment, during a frontal collision. For example, the Positive Temperature Coefficient (PTC) heater used for air heating in an electric vehicle is typically a high-current heater which produces heat through the use of high-voltage power. A PTC heater typically has a high-strength, high-mass body formed by casting. The PTC heater also has a high-current extraction unit. Accordingly, the PTC heater and its related components should be prevented from penetrating into the occupant space during a frontal collision.

Japanese Unexamined Patent Application Publication No. 2005-104354 describes an attachment bracket that is configured to prevent a high-mass body, such as that of a PTC heater, from penetrating into the vehicle occupant space during a collision. In particular, the attachment bracket is configured to break during a collision. A portion of the collision energy is expended by this breakage, thereby reducing the large kinetic energy of the high-mass body.

SUMMARY

However, it has been discovered that even in the technique proposed in Japanese Unexamined Patent Application Publication No. 2005-104354, the amount of backward displacement of the high-mass body during a vehicle collision is the sum of the amount of displacement when the high-mass body is displaced backward in conjunction with crushing during a collision at the vehicle front, and the amount of displacement when the high-mass body is displaced backward independently after breakage of the attachment bracket as described above. Accordingly, the backward displacement of the high-mass body during collision is not significantly reduced by this technique.

Also, increased performance and increased functionality of vehicles have resulted in less available space in the front-rear direction in the engine compartment in vehicles equipped with an internal combustion engine, or in the motor compartment in an electric vehicle. Thus, there is no significant reduction of backward displacement of a high-mass body during a collision in the configuration proposed in Japanese Unexamined Patent Application Publication No. 2005-104354, since there is little initial available space for enabling backward displacement of a high-mass body.

In addition, when the high-mass body is a high-current heater as described above, the heater should be placed out of easy reach in the vehicle front space. Thus, even less options are available for enabling backward displacement of a high-current heater.

Thus, the problems described above are difficult to avoid when backward displacement of a high-mass body during a collision is permitted. Therefore, an object of the present invention is to provide a vehicle collision safety apparatus that enables a high-mass body to rotate, for example, so as to deflect sideways in the vehicle during a collision. The high-mass body is thereby prevented or restricted from penetrating into the vehicle occupant space, such as the passenger compartment.

In view of the state of the known technology, a vehicle collision protection apparatus is proposed that basically comprises a bracket that includes a deflecting force generating component provided at a rear end of the bracket. The bracket is disposed in a vehicle front space of a vehicle and configured to extend in a front to rear direction of the vehicle and attach a vehicle component to a body of the vehicle. The deflecting force generating component is configured to deflect the rear end of the bracket in a width direction of the vehicle and rotate the bracket together with the vehicle component in the width direction when the deflecting force generating component impinges against a portion of the vehicle body as the rear end of the bracket is displaced in a rearward direction of the vehicle due to crushing of a front end of the vehicle during a collision at the front end of the vehicle.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
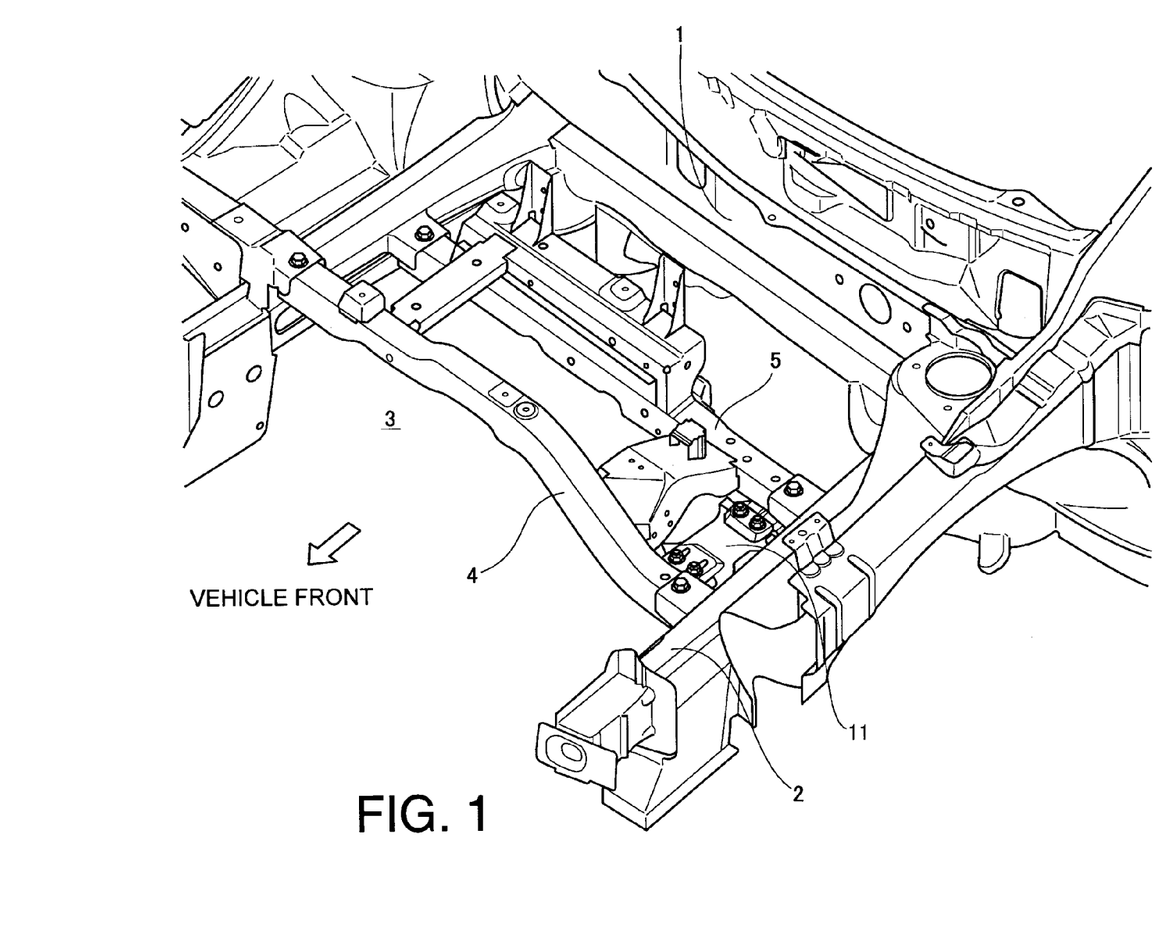
FIG. 1 is a perspective view from above the left side of a vehicle, such as an electric vehicle, showing an example of the frame of the vehicle body front that includes a collision protection apparatus according to a disclosed embodiment.

FIG. 1 is a perspective view taken from above the left side of a vehicle showing a portion of the frame of the vehicle body front of the vehicle that is provided with a collision protection apparatus according to a disclosed embodiment. In this example, the vehicle can be an electric vehicle or a hybrid vehicle, such as a car, truck, van, SUV and so on. A vehicle front space can be defined by a dash lower panel 1, a left front side member 2, a right front side member which is on the opposite side and not shown, and a front grille also not shown. Thus, the dash lower panel 1, the left front side member 2, the right front side member and the front grille define a motor compartment 3 as shown.

A front cross member 4 and a rear cross member 5 couple the left and right front side members to each other are provided in the lower region in the motor compartment 3. An electric motor, an inverter, a motor controller, a DC-DC converter, and other main components that are not shown can be attached to the front and rear cross members 4 and 5 and housed in the motor compartment 3.

Figure 2:
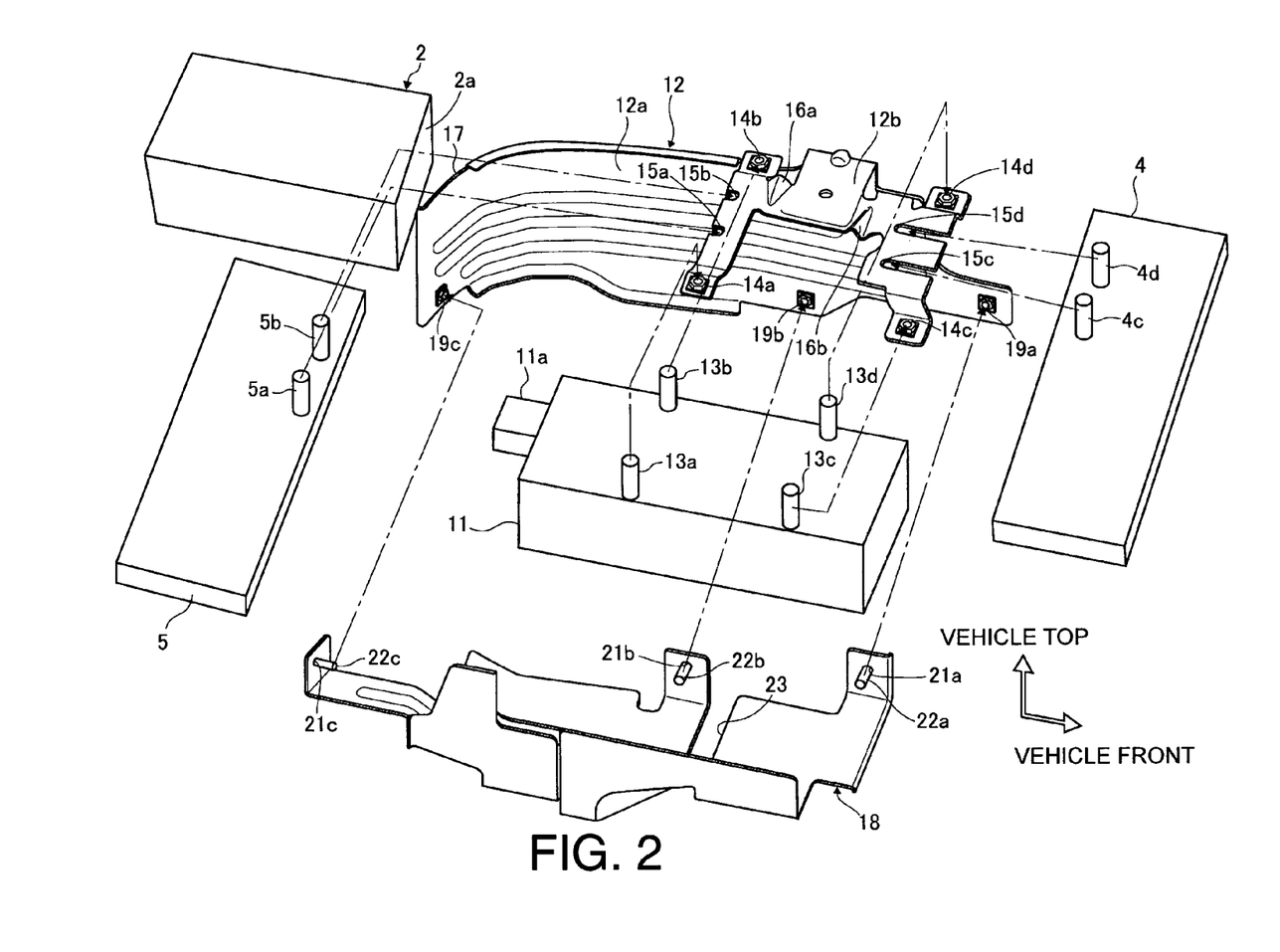
FIG. 2 is an exploded perspective view showing an example of a vehicle body attachment structure of a high-current heater and the collision protection apparatus shown in FIG. 1.

As shown in FIG. 1 and in more detail in FIG. 2, a PTC heater or other high-current heater 11 (e.g., a vehicle component) used for air warming in the electric vehicle can also be housed in the motor compartment 3. The high-current heater 11 produces heat through, for example, the use of high-voltage power, and can include a high-strength, high-mass body formed by casting as understood in the art. The high-current heater 11 in this example also has a high-current extraction unit 11a that extends from the rear end of the high-current heater 11 as viewed in the vehicle front-rear direction. Also, the high-current heater 11 in this example is attached to the front and rear cross members 4 and 5 via a bracket 12, such that the high-current heater 11 is attached in a position beside the left front side member 2 as shown in FIG. 1 and discussed below. As discussed herein, the collision protection apparatus is configured to prevent or at least restrict the high-current heater 11 from penetrating into an occupant space (e.g., a vehicle passenger compartment) which is partitioned from the motor compartment 3 by the dash lower panel 1 during a frontal collision of the vehicle. Further details of the front and rear cross members 4 and 5, the high-current heater 11 and the bracket 12 will now be discussed with regard to FIGS. 2-4.

Figure 5:
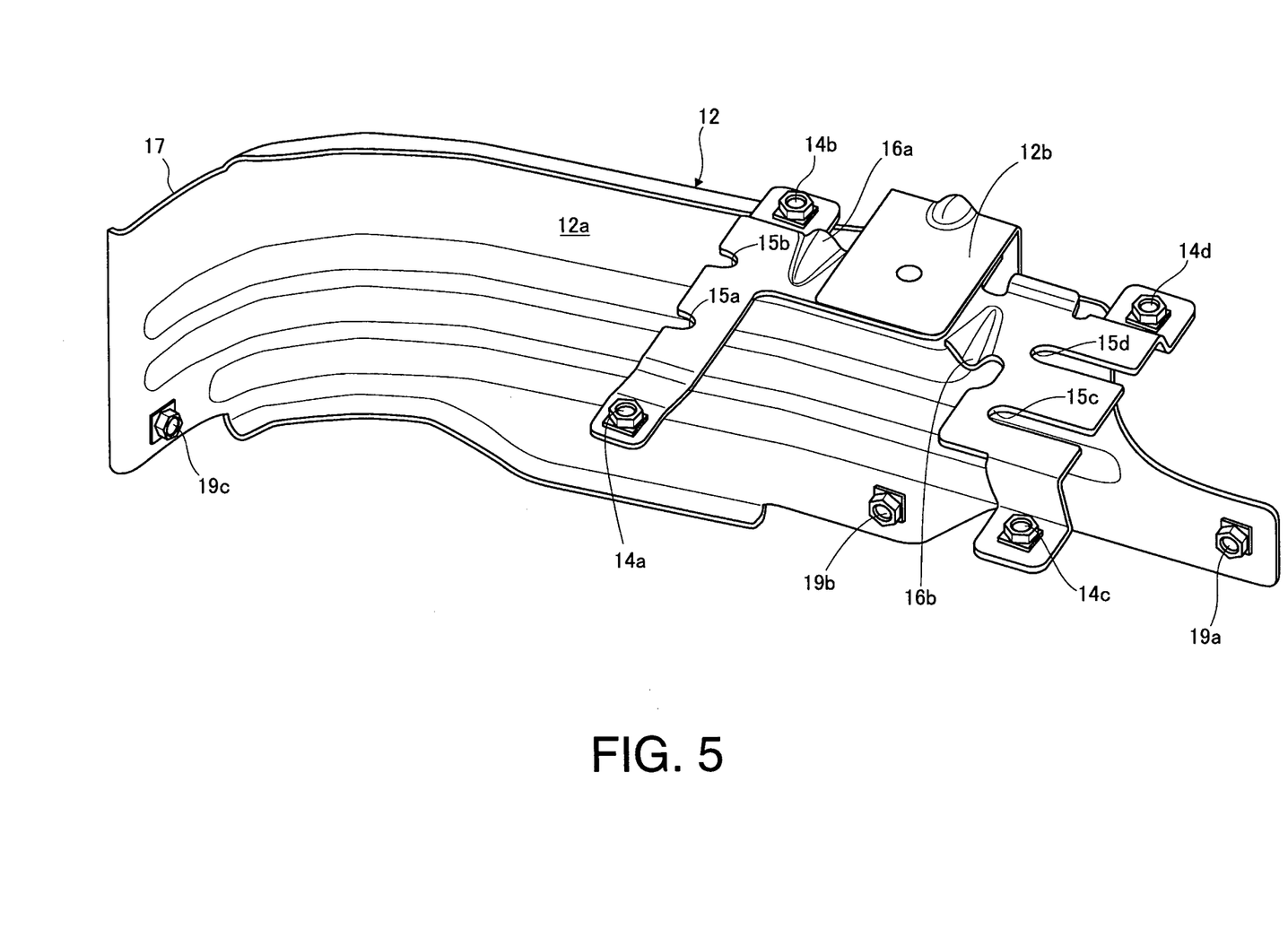
FIG. 5 is a perspective view showing the vehicle body attachment bracket in FIG. 4.

As illustrated, pins 13a, 13b, 13c and 13d extend the top surface of the high-current heater 11 and can be used to couple the high-current heater 11 to the bracket 12. The bracket 12 includes a plate-shaped main body 12a having a portion which extends into a gap between the left front side member 2 and the high-current heater 11. As is apparent from FIG. 5 showing the bracket 12 alone, the bracket 12 also includes an angled plate 12b which extends from the top edge of the plate-shaped main body 12a so as to hang over the top surface of the high-current heater 11. The angled plate 12b further defines through-holes 14a, 14b, 14c, 14d that receive the pins 13a, 13b, 13c, 13d, respectively, that extend from the top surface of the high-current heater 11.

Figure 3:
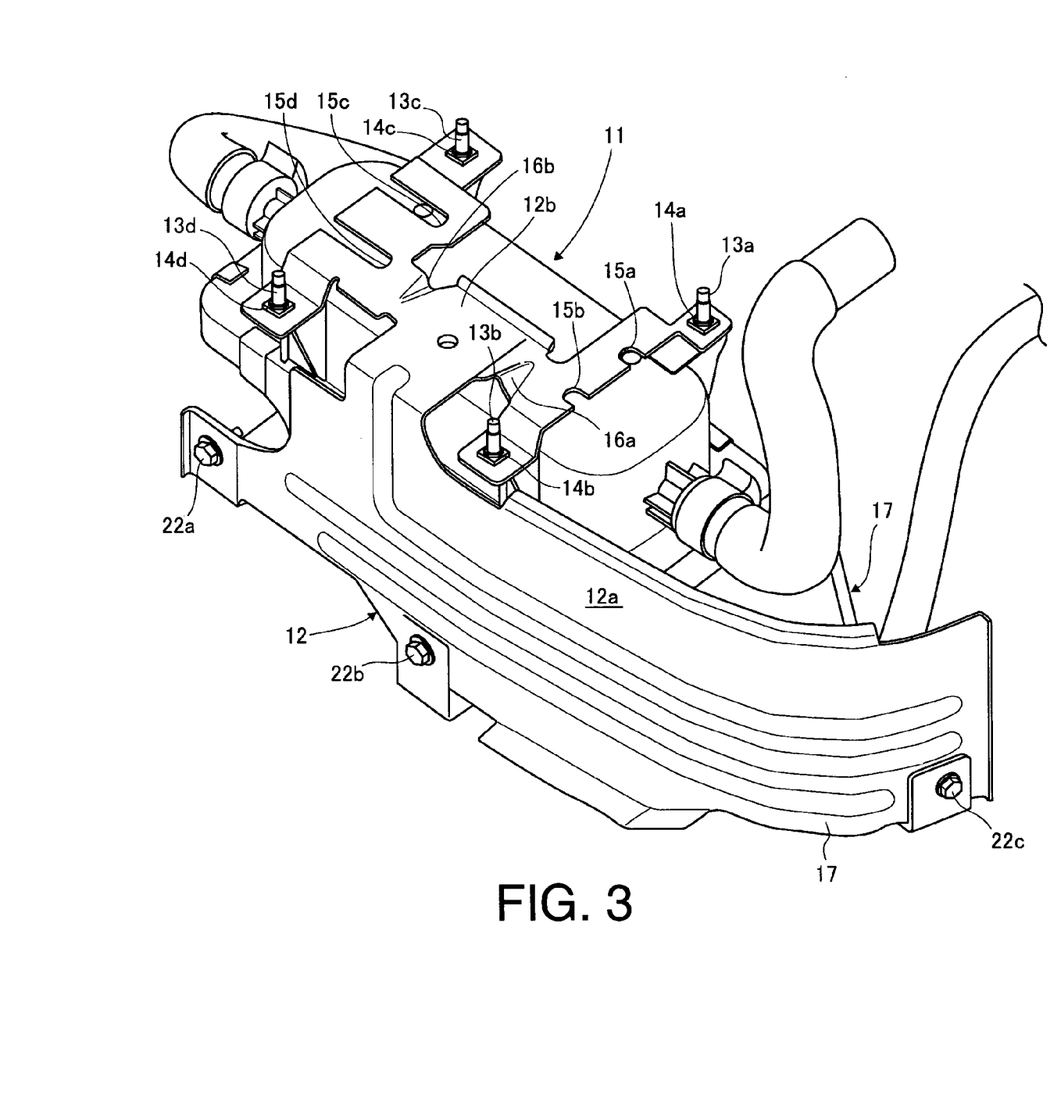
FIG. 3 is a perspective view showing the vehicle body attachment bracket and the high-current heater in FIG. 2.
Figure 4:
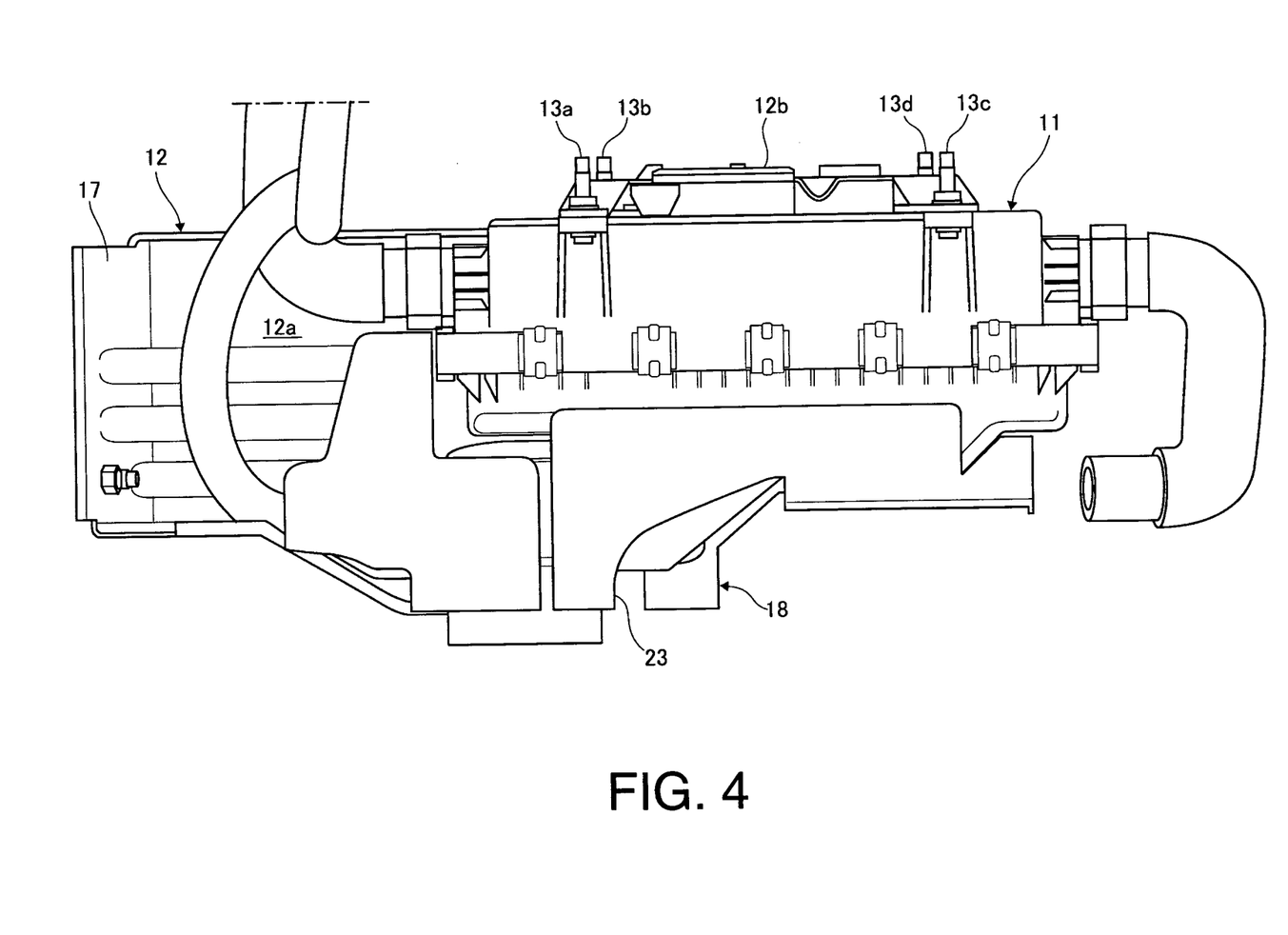
FIG. 4 is a side view showing the vehicle body attachment bracket and the high-current heater in FIG. 2.

The high-current heater 11 is assembled with the bracket 12 in preliminary fashion as shown in FIGS. 3 and 4 by placing the pins 13a, 13b, 13c and 13d through the corresponding through-holes 14a, 14b, 14c and 14d, respectively, of the angled plate 12b. The distal ends of the pins 13a, 13b, 13c and 13d can be retained in the through-holes 14a, 14b, 14c and 14d by any type of suitable fastener, such as nuts that thread onto the distal ends of the pins 13a, 13b, 13c and 13d as shown in FIG. 5.

The angled plate 12b of the bracket 12 further defines open elongated holes 15a, 15b, 15c and 15d which are open at both edges of the angled plate 12b in the vehicle front-rear direction. In this example, each of the open elongated holes 15c and 15d are longer than each of the open elongated holes 15a and 15b. Pins 4c and 4d for engaging with the open elongated holes 15c and 15d, respectively, extend from the cross member 4. Also, pins 5a and 5b for engaging with the open elongated holes 15a and 15b, respectively, extend from the cross member 5.

When the preliminary assembly of the high-current heater 11 and the bracket 12 are assembled to the front and rear cross members 4 and 5, the pins 5a and 5b on the cross member 5 engage the open elongated holes 15a and 15b, respectively, of the angled plate 12b. Also, the pins 4c and 4d on the cross member 4 engage the open elongated holes 15c and 15d, respectively, of the angled plate 12b. The distal ends of the pins 4c and 4d on the cross member 4 can be secured to the open elongated holes 15c and 15d, respectively, by any type of suitable fastener, such as nuts that thread onto the distal ends of the pins 4c and 4d. Similarly, the distal ends of the pins 5a and 5b on the cross member 5 can be secured to the open elongated holes 15a and 15b, respectively, by any type of suitable fastener, such as nuts that thread onto the distal ends of the pins 5a and 5b. Accordingly, the bracket 12 is attached to a vehicle body member other than the front side member 2. In this case, the bracket 12 is attached to the cross members 4 and 5.

In addition, notches 16a and 16b are formed in the angled plate 12b that create fragile parts in the angled plate 12b to reduce the strength with which the high-current heater 11 is attached to the bracket 12. For example, the notch 16a functions as a strength-reducing fragile part for the attachment of the high-current heater 11 by the mating of the pins 5a and 5b and the open elongated holes 15a and 15b. Similarly, the notch 16b functions as a strength-reducing fragile part for the attachment of the high-current heater 11 by the mating of the pins 4c and 4d and the open elongated holes 15c and 15d. The strength of each notch 16a and 16b is set so that the notches 16a and 16b can be broken by an inertial force of the high-current heater 11 or an impact force that is generated in conjunction with crushing the front end of the vehicle during a collision at the vehicle front, such as at the motor compartment 3. Accordingly, the braking of the notches 16a and 16b enables the high-current heater 11 to drop out from the bracket 12 during a collision as discussed in more detail below.

The plate-shaped main body 12a of the bracket 12 further includes a curved part 17 which curves in the direction away from the left front side member 2 so as to surround or at least partially surround the high-current extraction unit 11a of the high-current heater 11. The curved part 17 can thus function, at least in part, as a deflecting force generating part which can deflect the rear end (e.g., curved part 17) of the bracket 12 toward the inside in the vehicle width direction and rotate the bracket 12 together with the high-current heater 11 in the corresponding direction about the vehicle body attachment part when the rear end (curved part 17) of the bracket 12 is displaced backward in conjunction with crushing during a collision at the vehicle front (e.g., motor compartment 3).

In addition, a high-current-heater receiving member 18 functions as a high-mass-body receiving member for receiving the high-current heater 11 which drops out from the bracket 12 as a result of breakage of the notches 16a and 16b of the angled plate 12b during a collision. As discussed in more detail below, the high-current-heater receiving member 18 can prevent the high-current heater 11 from falling onto the ground surface below the vehicle. The high-current-heater receiving member 18 (high-mass-body receiving member) can be channel shaped overall as shown, for example, in FIG. 6. Thus, by having the channel shape, the high-current-heater receiving member 18 can continue to retain the high-current heater 11 and prevent the high-current heater 11 from falling.

That is, the high-current-heater receiving member 18 is attached to the bracket 12 (plate-shaped main body 12a) as shown, for example, in FIG. 2. Specifically, the bottom edge of the plate-shaped main body 12a (including the curved part 17) defines through-holes 19a, 19b and 19c therein that are arranged in the vehicle front-rear direction. Furthermore, the high-current-heater receiving member 18 defines through-holes 21a, 21b and 21c that can be arranged in alignment with the through-holes 19a, 19b and 19c, respectively. When the high-current-heater receiving member 18 is attached to the bracket 12 (plate-shaped main body 12a), the through-holes 19a, 19b and 19c at the bottom edge of the plate-shaped main body 12a are aligned with the through-holes 21a, 21b and 21c of the high-current-heater receiving member 18. Any suitable fastening member, such as bolts 22a, 22b and 22c are secured through the aligned through-holes as shown. Accordingly, the bolts 22a, 22b and 22c secure the high-current-heater receiving member 18 to the bracket 12 (plate-shaped main body 12a).

Figure 6:
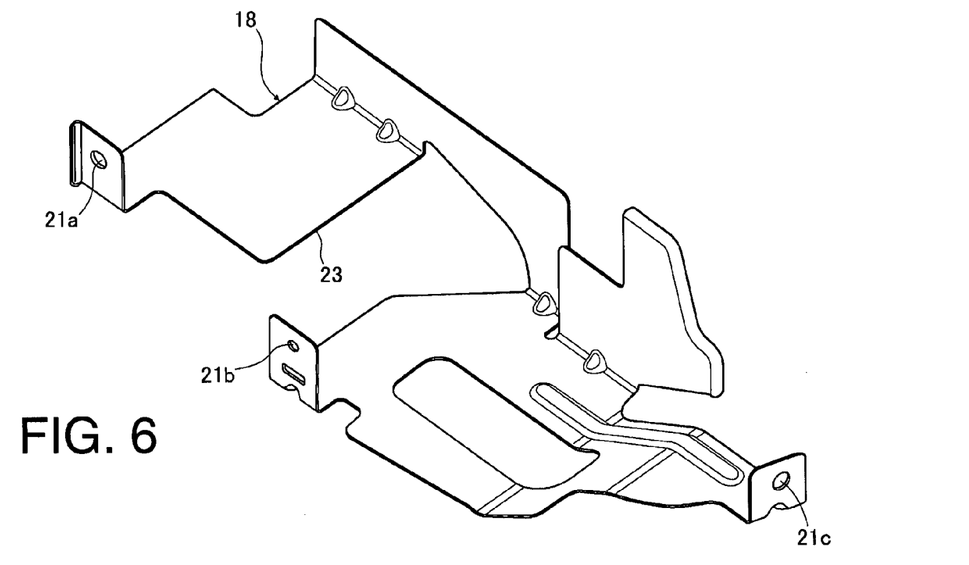
FIG. 6 is a perspective view showing the high-current heater receiving member in FIG. 4.
Figure 7A:
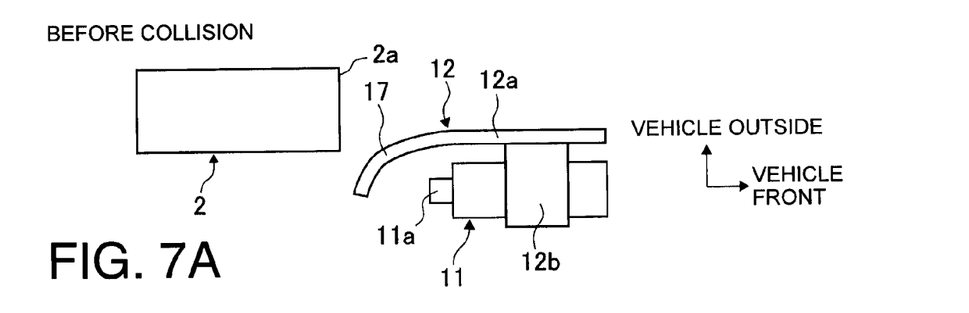
FIG. 7A is a simplified top plan view of an exemplary state of the collision protection apparatus as shown in FIGS. 1 and 2 prior to a frontal collision of the vehicle.
Figure 7B:
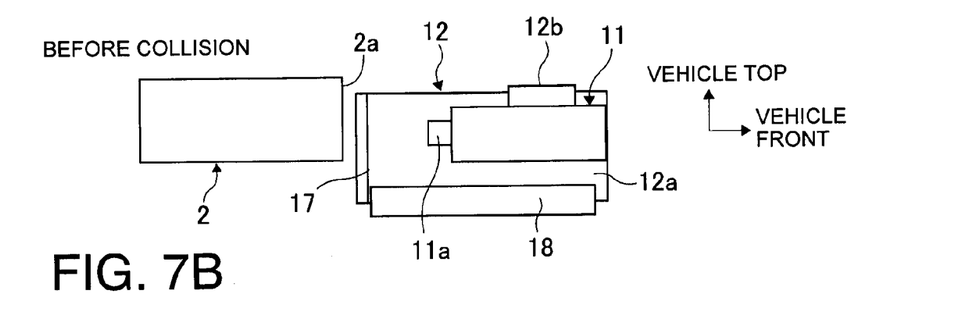
FIG. 7B is a simplified side elevational view of the exemplary state of the collision protection apparatus prior to a frontal collision of the vehicle.

In addition, a notch 23 is formed in the high-current-heater receiving member 18. The notch 23 enables the high-current-heater receiving member 18 to easily deform in conformity with the deformation of the bracket 12. The channel shape of the high-current-heater receiving member 18 thus prevents the high-current heater 11 from falling, and also preferably deforms in conformity with the bracket 12 so as not to impede deformation of the bracket 12 during a collision.

An example of the operational of the collision protection apparatus as described above will now be discuss with regard to the diagrams shown in FIGS. 7A through 10C. Prior to a collision, the components discussed above are in a state as shown in FIGS. 7A, 7B and 10A. When a frontal collision of the vehicle occurs, collision energy can be applied to the vehicle front in the direction indicated by the arrow in FIG. 10B. That is, the collision energy can be applied to the vehicle front in a direction toward the rear of the vehicle. As a result, the vehicle front is crushed by the collision energy as shown in FIG. 10B. When this occurs, the front side member 2 buckles so as to project in the direction intersecting the vehicle front-rear direction, such as inward in the vehicle width direction, at a predetermined buckling location 2a. The bracket 12 on the front and rear cross members 4 and 5, and the high-current heater 11 which is attached to the bracket 12, are also displaced backward in the vehicle front-rear direction in conjunction with the crushing of the vehicle front.

Figure 10A:
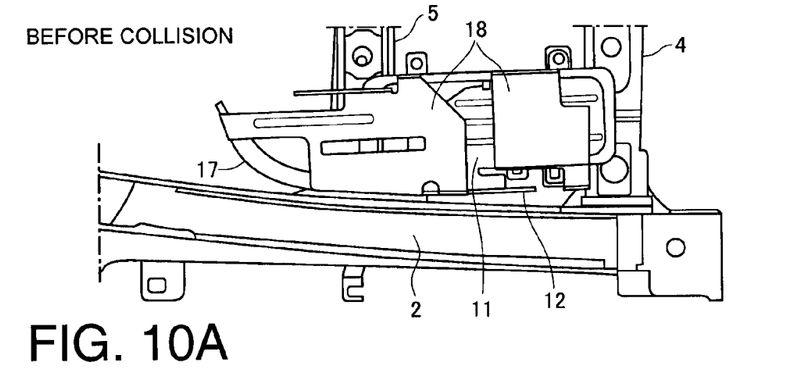
FIG. 10A is a bottom plan view showing an exemplary state of the collision protection apparatus prior to the frontal collision of the vehicle.
Figure 10B:
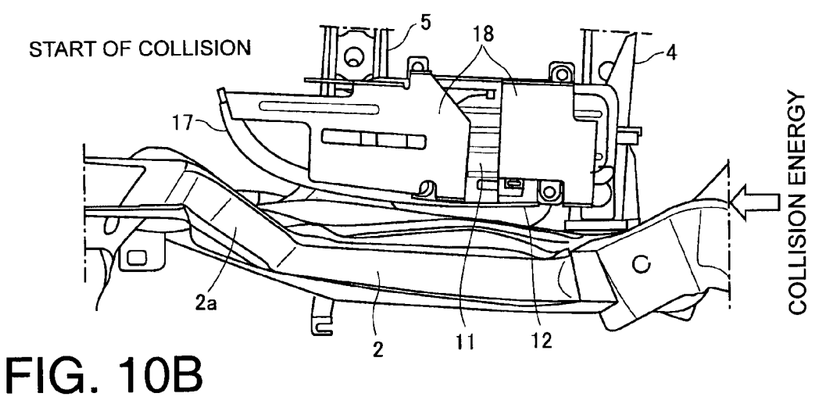
FIG. 10B is a bottom plan view showing an exemplary state of the collision protection apparatus at the start of the frontal collision.
Figure 10C:
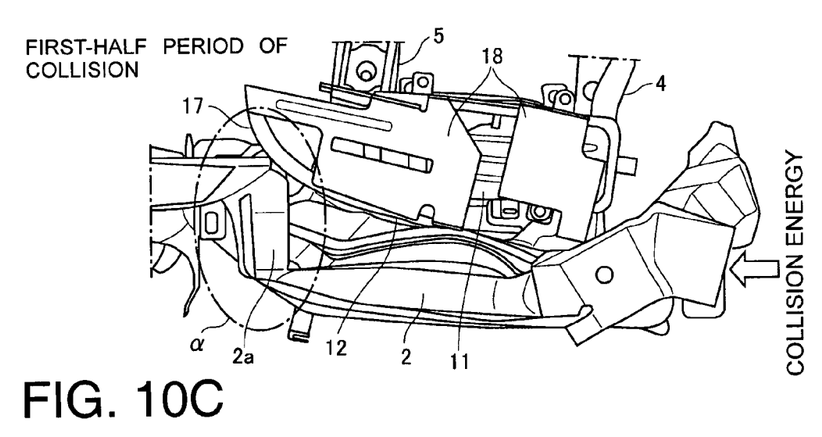
FIG. 10C is a bottom view showing an exemplary state of the collision protection apparatus during the first-half of the collision period.

When the vehicle front is subsequently crushed to a more significant degree, the buckling part 2a of the front side member 2 buckles substantially into a crank shape as shown in FIG. 10C. Therefore, the buckling part 2a projects even further inward in the vehicle width direction. As a result, the bracket 12 and the high-current heater 11 at the same time are even further displaced backward as shown in FIGS. 8A, 8B, and 10C.

Figure 8A:
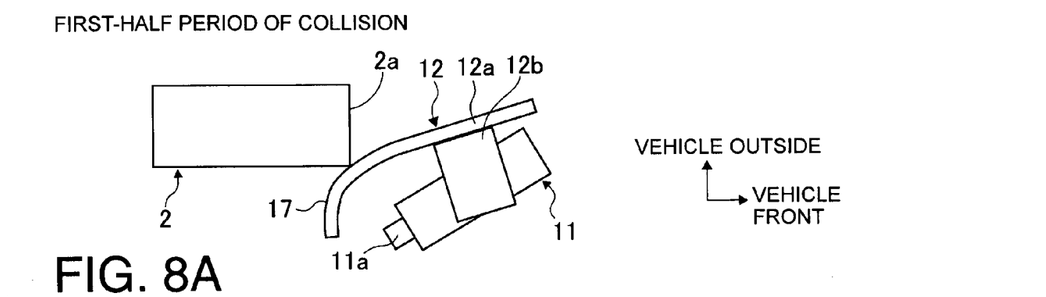
FIG. 8A is a simplified top plan view showing an exemplary state of the collision protection apparatus during the first-half of a collision period after a frontal collision of the vehicle has occurred.
Figure 8B:
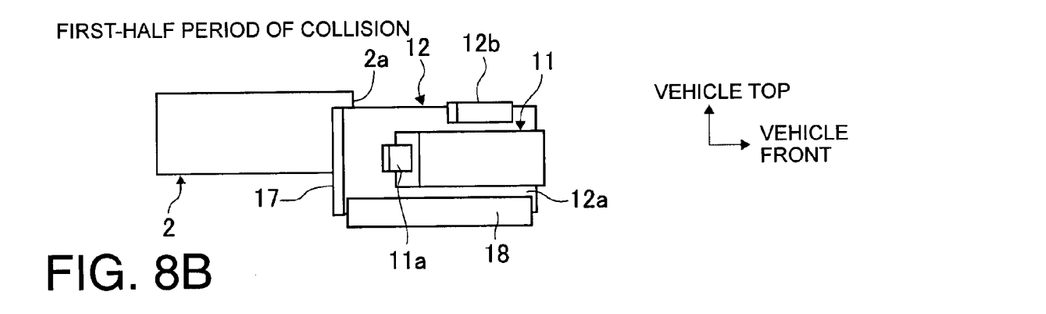
FIG. 8B is a simplified side elevational view showing the exemplary state of the collision protection apparatus during the first-half of the collision period.

The further projection of the buckling part 2a inward in the vehicle width direction, and the further backward displacement of the bracket 12 and the high-current heater 11, cause the curved part 17 at the rear end of the bracket 12 (plate-shaped main body 12a) to impinge against the crank-shaped buckling part 2a as shown in FIG. 8A and indicated by region α in FIG. 10C. At this time, the curved part 17 imparts a deflection force to the rear end of the bracket 12 inward in the vehicle width direction by a cam operation created by the impingement against the crank-shaped buckling part 2a. This deflection force thus deflects and rotates the bracket 12 together with the high-current heater 11 in a corresponding direction.

Accordingly, when the rear end of the bracket 12 impinges against the crank-shaped buckling part 2a of the vehicle body portion as a result of the backward displacement, the deflecting force generating part provided to the rear end of the bracket 12 deflects the rear end of the bracket 12 in the vehicle width direction and rotates the bracket 12 together with the high-current heater 11 (high-mass body vehicle component) in the corresponding direction. Since the bracket 12 rotates together with the high-current heater 11 in this manner, a portion of the collision energy is expended. Although the displacement of the bracket 12 and the high-current heater 11 during the collision is initially a backward displacement, the displacement subsequently changes to a rotational displacement. Thus, the bracket 12 and the high-current heater 11 are prevented from penetrating into the vehicle occupant space.

At the same or substantially the same time that the rear end of the bracket 12 is deflected in the vehicle width direction and the bracket 12 together with the high-current heater 11 are rotated, the fragile notches 16a and 16b in the angled plate 12b of the bracket 12 are broken by the impact force or inertial force. Accordingly, the high-current heater 11 drops out from the bracket 12 as shown in FIG. 8B. When the high-current heater 11 drops out from the bracket 12, the high-current heater 11 is received by the high-current heater receiving member 18 as shown in FIG. 9B. The cooperation of the high-current heater receiving member 18 with the bracket 12, for example, thus enables the high-current heater receiving member 18 to continue to hold and prevent the dropped-out high-current heater 11 from falling out of the vehicle onto the ground surface.

Figure 9A:
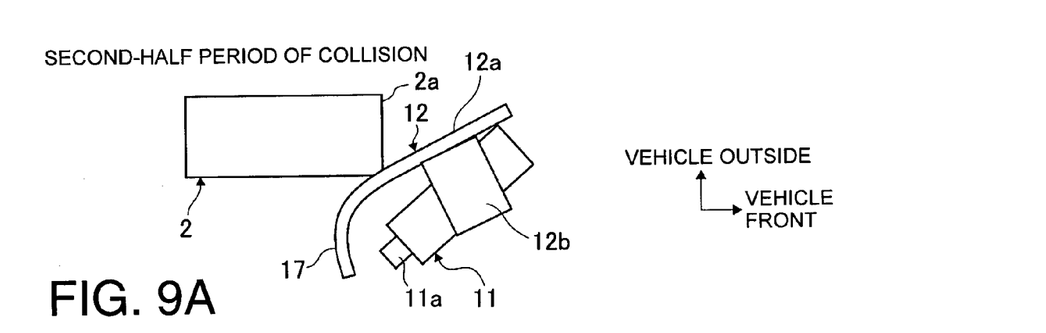
FIG. 9A is a simplified top plan view showing an exemplary state of the collision protection apparatus during a second-half of the collision period.
Figure 9B:
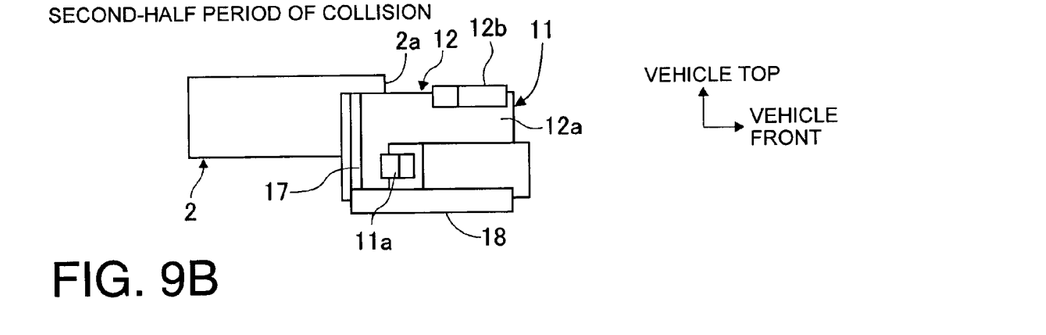
FIG. 9B is a simplified side elevational view showing the exemplary state of the collision protection apparatus during the second-half of the collision period.

When further crushing of the vehicle front causes the bracket 12 to be further displaced backward, the bracket 12 is continuously subjected to a deflecting force inward in the vehicle width direction from the buckling part 2a in a fixed position as shown, for example, in FIG. 9A. The bracket 12 can be even further rotated in the corresponding direction, and ultimately can be turned sideways. Nevertheless, during this displacement of the bracket 12, the high-current heater 11 remains held by the cooperation of the high-current-heater receiving member 18 and the bracket.

As can be appreciated from the above, the disclosed embodiment is capable of providing vehicle collision safety. For example, while the bracket 12 is displaced backward in conjunction with crushing during a collision at the vehicle front, the curved part 17 at the rear end of the bracket 12 impinges against the crank-shaped buckling part 2a of the front side member 2 that occurs during the collision. Also, the rear end of the bracket 12 is deflected inward in the vehicle width direction, and the bracket 12 is rotated together with the high-current heater 11 in the corresponding direction. A portion of the collision energy can therefore be expended by the directional conversion from backward displacement to rotational displacement of the bracket 12 and the high-current heater 11. Hence, the bracket 12 and the high-current heater 11 are prevented or at least restricted from penetrating into the occupant space to the rear, and collision safety standards can thus be satisfied.

Furthermore, since the curved part 17 is configured to surround or at least partially surround the high-current extraction unit 11a of the high-current heater 11, the curved part 17 can prevent the high-current extraction unit 11a of the high-current heater 11 from touching the vehicle body portion during the operations described above. Thus, vehicle safety is improved. In addition, during the directional conversion from backward displacement to rotational displacement of the bracket 12 and the high-current heater 11, the impact force or inertial force at this time causes the high-current heater 11 to break the fragile notches 16a and 16b in the angled plate 12b of the bracket 12. As a result, the high-current heater 11 drops out from the bracket 12. A portion of the energy can therefore be expended by this breakage, thus providing further collision safety.

It should also be noted that if the high-current heater 11 is prevented from dropping out from the bracket 12 to any degree, the bracket 12 which includes the angled plate 12b has a sufficiently sturdy structure so that the bracket 12 does not readily rotate as described above. However, in the configuration described above, the high-current heater 11 breaks the fragile notches 16a and 16b and drops out from the bracket 12. As a result, the bracket 12 easily deforms, the rotation described above readily occurs, and the operational effects described above can be reliably obtained. Furthermore, the fragile structure of the bracket 12 can reduce manufacturing cost and weight of the bracket 12.

As can be appreciated from the above, a portion of the collision energy is expended by the rotational displacement of the bracket 12 and the high-current heater 11. Thus, the bracket 12 and the high-current heater 11 are prevented or at least restricted from penetrating into the occupant space. Moreover, in the vehicle front space, such as the motor compartment 3), more excess space exists in the transverse direction than in the front-rear direction. Accordingly, the bracket 12 and the high-current heater 11 can move into this excess space during a frontal collision, and are prevented or at least restricted from penetrating into the occupant space to reliably provide collision safety as described above.

In addition, as discussed above, after the high-current heater 11 breaks the fragile notches 16a and 16b and drops out from the bracket 12, the high-current heater 11 is received by the receiving member 18. The high-current-heater receiving member 18 subsequently continues to hold the high-current heater 11 via cooperation with the bracket 12 so that the high-current heater 11 does not fall out of vehicle and, for example, onto the ground surface. Furthermore, the notch 23 in the high-current-heater receiving member 18 enables the high-current-heater receiving member 18 to easily deform in conformity with the deformation of the bracket 12. Thus, the bracket 12 can easily deform even with the presence of the high-current-heater receiving member 18.

Also, as described above, the curved part 17 at the rear end of the bracket 12, which is displaced backward during collision, is configured to impinge against the buckling part 2a of the front side member 2 during the collision. Hence, the bracket 12 (plate-shaped main body 12a) has a portion (curved part 17) that is disposed in front of the buckling part 2a of the front side member 2, and can impinged against by the curved part 17 to restrict rearward movement.

Alternatively, the curved part 17 does not necessarily need to impinge against the buckling part 2a of the front side member 2 that occurs during collision. Rather, the curved part 17 may be configured so as to impinge against a different vehicle body portion or an added component during a collision. In this type of configuration, the bracket 12 (plate-shaped main body 12a) need not have a portion (e.g., curved portion 17) that is disposed beside the front side member 2 or in front of the buckling part 2a. This increases the degree of freedom with regard to the placement of the bracket 12 and the placement of the high-current heater 11.

It is also apparent from the above that the components such as the bracket 12, high-current-heater receiving member 18 and so on can be configured to prevent or at least restrict other components from penetrating the occupant space during a collision. Accordingly, the components can be configured so that no component is permitted to penetrate into the occupant space during a collision.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with a vehicle collision protection apparatus. Accordingly, these terms, as utilized to describe the present invention should be interpreted relative to a vehicle equipped with a vehicle collision protection apparatus.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle collision protection apparatus comprising:
a vehicle body including a vehicle body portion; and
a bracket mounted to the vehicle body in a vehicle front space located in front of the vehicle body portion, the bracket extending in a front to rear direction of the vehicle body and configured to attach a vehicle component to the vehicle body, the bracket including a mounting portion and a deflecting force generating component that is integrally formed with the bracket and that extends beyond the mounting portion in front of the vehicle body portion so as to at least partially surround the vehicle component,
the deflecting force generating component being configured to deflect a rear end of the bracket about a vertical axis of the vehicle body and rotate the bracket together with the vehicle component about the vertical axis of the vehicle body when the deflecting force generating component impinges against the vehicle body portion as the rear end of the bracket is displaced in a rearward direction of the vehicle due to crushing of a front end of the vehicle during a collision at the front end of the vehicle body.

2. The vehicle collision protection apparatus according to claim 1, wherein
the deflecting force generating component includes a curved portion.

3. The vehicle collision protection apparatus according to claim 2, wherein
the vehicle component includes a high-current heater for an electric vehicle, the high-current heater including a high-current extraction unit at the rear end of the vehicle body in the front-rear direction thereof; and
the curved portion is provided at the rear end of the bracket so as to surround the high-current extraction unit of the high-current heater.

4. The vehicle collision protection apparatus according to claim 1, wherein
the vehicle body portion against which the deflecting force generating component impinges includes a buckling part of the vehicle body that buckles so as to project in a direction intersecting the vehicle front to rear direction in conjunction with the crushing during the collision at the front end of the vehicle body.

5. The vehicle collision protection apparatus according to claim 1, wherein
the vehicle body comprises left and right front side members, the left and right front side members being joined by a cross member, and the vehicle component is disposed beside one of the left and right front side members and attached to the cross member via the bracket; and
the vehicle body portion against which the deflecting force generating component impinges includes a buckling part that is disposed on the one of the left and right front side members such that the buckling part projects in the direction intersecting the vehicle front to rear direction in conjunction with the crushing.

6. The vehicle collision protection apparatus according to claim 1, wherein
the bracket includes a fragile portion configured such that an attachment strength by which the vehicle component is attached to the bracket at the fragile portion is less than an attachment strength at other portions of the bracket; and
the fragile portion is configured to break due to an impact that occurs when the rear end of the bracket is displaced in the rearward direction in conjunction with the crushing, so that the vehicle component disconnects from the bracket.

7. The vehicle collision protection apparatus according to claim 6, further comprising
a receiving member that is configured to receive the vehicle component that disconnects from the bracket upon breakage of the fragile portion of the bracket.

8. The vehicle collision protection apparatus according to claim 7, wherein
the receiving member defines a notch that enables the receiving member to deform in accordance with deformation of the bracket.

9. The vehicle collision protection apparatus according to claim 1, wherein
the bracket includes a plate-shaped main body and an angled plate extending from the plate-shaped main body,
the angled plate defining at least one elongated hole extending in the vehicle front to rear direction that engages a part of the vehicle body.

10. The vehicle collision protection apparatus according to claim 2, wherein
the vehicle body portion against which the deflecting force generating component impinges includes a buckling part of the vehicle body that buckles so as to project in a direction intersecting the vehicle front to rear direction in conjunction with the crushing during the collision at the front end of the vehicle body.

11. The vehicle collision protection apparatus according claim 2, wherein
the vehicle body comprises left and right front side members, the left and right front side members being joined by a cross member, and the vehicle component is disposed beside one of the left and right front side members and attached to the cross member via the bracket; and
the vehicle body portion against which the deflecting force generating component impinges includes a buckling part that is disposed on the one of the left and right front side members such that the buckling part projects in the direction intersecting the vehicle front to rear direction in conjunction with the crushing.

12. The vehicle collision protection apparatus according to claim 2, wherein
the bracket includes a fragile portion configured such that an attachment strength by which the vehicle component is attached to the bracket at the fragile portion is less than an attachment strength at other portions of the bracket; and
the fragile portion is configured to break due to an impact that occurs when the rear end of the bracket is displaced in the rearward direction in conjunction with the crushing, so that the vehicle component disconnects from the bracket.

13. The vehicle collision protection apparatus according to claim 12, further comprising a receiving member that is configured to receive the vehicle component that disconnects from the bracket upon breakage of the fragile portion of the bracket.

14. The vehicle collision protection apparatus according to claim 13, wherein the receiving member defines a notch that enables the receiving member to deform in accordance with deformation of the bracket.

15. The vehicle collision protection apparatus according to claim 3, wherein the vehicle body portion against which the deflecting force generating component impinges includes a buckling part of the vehicle body that buckles so as to project in a direction intersecting the vehicle front to rear direction in conjunction with the crushing during the collision at the front end of the vehicle body.

16. The vehicle collision protection apparatus according claim 3, wherein the vehicle body comprises left and right front side members, the left and right front side members being joined by a cross member, and the vehicle component is disposed beside one of the left and right front side members and attached to the cross member via the bracket; and the vehicle body portion against which the deflecting force generating component impinges includes a buckling part that is disposed on the one of the left and right front side members such that the buckling part projects in the direction intersecting the vehicle front to rear direction in conjunction with the crushing.

17. The vehicle collision protection apparatus according to claim 3, wherein the bracket includes a fragile portion configured such that an attachment strength by which the vehicle component is attached to the bracket at the fragile portion is less than an attachment strength at other portions of the bracket; and the fragile portion is configured to break due to an impact that occurs when the rear end of the bracket is displaced in the rearward direction in conjunction with the crushing, so that the vehicle component disconnects from the bracket.

18. The vehicle collision protection apparatus according to claim 17, further comprising a receiving member that is configured to receive the vehicle component that disconnects from the bracket upon breakage of the fragile portion of the bracket.

19. The vehicle collision protection apparatus according to claim 18, wherein the receiving member defines a notch that enables the receiving member to deform in accordance with deformation of the bracket.

20. The vehicle collision protection apparatus according to claim 3, wherein the bracket includes a plate-shaped main body and an angled plate extending from the plate-shaped main body, the angled plate defining at least one elongated hole extending in the vehicle front to rear direction that engages a part of the vehicle body.

* * * * *